(12) United States Patent
Rogell

(10) Patent No.: US 7,478,485 B1
(45) Date of Patent: Jan. 20, 2009

(54) OBTUSE ANGLE RANGE ADJUSTABLE SQUARE AND METHOD

(76) Inventor: Jay Michael Rogell, 3501 Stage Springs Rd., Creston, CA (US) 93432

( * ) Notice: Subject to any disclaimer, the term of this patent is extended or adjusted under 35 U.S.C. 154(b) by 21 days.

(21) Appl. No.: 11/697,297

(22) Filed: Apr. 5, 2007

(51) Int. Cl.
*B43L 7/027* (2006.01)
*B43L 13/00* (2006.01)

(52) U.S. Cl. .......................................... 33/421; 33/423

(58) Field of Classification Search .................. 33/421, 33/415, 416, 417, 418, 420, 422, 423, 424, 33/425, 426, 429, 465, 471
See application file for complete search history.

(56) References Cited

U.S. PATENT DOCUMENTS

| | | | | |
|---|---|---|---|---|
| 330,799 A * | 11/1885 | Orendorff | | 33/426 |
| 650,436 A * | 5/1900 | Townsend et al. | | 33/420 |
| 894,770 A * | 7/1908 | Wood | | 33/425 |
| 960,196 A * | 5/1910 | Powell | | 33/342 |
| 1,521,980 A * | 1/1925 | Zook | | 33/423 |
| 2,480,362 A * | 8/1949 | Graff | | 33/424 |
| D290,092 S | 6/1987 | Bies | | |
| 4,712,307 A * | 12/1987 | Kish | | 33/421 |
| 4,742,619 A | 5/1988 | Swanson | | |
| 5,170,568 A | 12/1992 | Wright | | |
| 6,725,555 B1 | 4/2004 | Moore | | |
| 6,868,616 B2 * | 3/2005 | Allemand | | 33/476 |
| 7,114,264 B1 | 10/2006 | Hurley et al. | | |
| 7,188,427 B2 * | 3/2007 | Johnson | | 33/471 |
| D561,620 S * | 2/2008 | Rogell | | D10/65 |
| 2005/0210693 A1* | 9/2005 | Collins et al. | | 33/471 |

* cited by examiner

*Primary Examiner*—Christopher W Fulton
(74) *Attorney, Agent, or Firm*—William Kegworth; Bill & Mary Lou Inc.

(57) ABSTRACT

An obtuse angle range adjustable square provides an extended angle adjustment that minimizes the user's reach distance required to mark framing cuts. The frame of the obtuse angle range adjustable square has a triangular section and an extended slot extension section that allows a pivoting guide mounted on the frame to be set to a range of acute and obtuse angles providing flexibility in the use of the square. The pivoting guide may be stably rested on a framing member edge to mark the transverse side of the member.

3 Claims, 3 Drawing Sheets

US 7,478,485 B1

OBTUSE ANGLE RANGE ADJUSTABLE SQUARE AND METHOD

CROSS-REFERENCE TO RELATED APPLICATIONS

Not Applicable

STATEMENT REGARDING FEDERALLY SPONSORED RESEARCH AND DEVELOPMENT

Not Applicable.

BACKGROUND OF THE INVENTION

1. Field of the Invention

This application relates to a construction tool used to layout cuts to be made to the framing of a structure and the method of using the tool. The tool includes an extended arc adjustment range that provides for more flexibility and greater user safety in the layout of a building framing.

2. Description of Related Art

Framing squares are known in the art. U.S. Pat. No. D290,092 (Bies), U.S. Pat. No. 4,742,619 (Swanson), U.S. Pat. No. 5,170,568 (Wright), U.S. Pat. No. 6,727,555 (Moore), and U.S. Pat. No. 7,114,264 (Hurley et al.) show an evolution in right-triangular roofing squares. This provides a tool that makes it difficult to mark roof rafter cuts used to align the rafter ends for fascia board attachment. This is due to the need for the user, who is on the top of the adjacent wall, to lean far out from the wall to mark the cut, as the square needs to be on the opposite side of the cut mark. A square that requires less user reach is needed.

SUMMARY OF THE INVENTION

The obtuse angle range adjustable square is a framing construction layout tool that allows accurate marking of cuts in a range of angles, including those that are greater than ninety degrees. The tool has a frame with two sides that are marked with roof slopes. The frame has a triangular section arranged in a right isosceles triangle-shaped outer periphery composed of a first (plumb cut) and second (seat cut) right angle periphery edges and a hypotenuse periphery edge. A pivot opening in the frame is adjacent to the right angle of the triangular section. An adjustment slot is arranged for a pivoting guide that is pinned to the pivot opening. This adjustment slot is located at a fixed radius from the pivot opening starting at a set location substantially 20 degrees from the first (plumb cut) right angle periphery edge and is continuous to a position a set distance from the second (seat cut) right angle periphery edge. The adjustment slot is extended on one side periphery of the triangular section by a slot extension section extending from the triangular section side to a location parallel to the other side periphery. The adjustment slot extends into a slot extension section of the frame. This slot extension section has a interior periphery edge facing the triangular section and an exterior periphery edge facing away from the triangular section. The slot extension section is terminated by a distal periphery edge arranged substantially coplanar with the triangular section first (plumb cut) right angle periphery edge. The adjustment slot in the extension section is at the same fixed radius from the pivot opening as the adjustment slot in the triangular section.

A pivoting guide is composed of two similar portions with substantially parallel and straight edges and substantially parallel first and second surfaces, the first portion second surface is arranged adjacent to the frame first side, and the second portion is arranged with the second surface adjacent to the frame second side. The two pivoting guide portions are connected at the frame pivot opening with a hinge pin and further arranged with a guide pin connecting the portions, and adjustably arranged in the frame adjustment slot, and further arranged to releasably clamp the pivoting guide portions to the frame such that the angular location of the pivoting guide may be moved to, and removeably secured, in a desired location. The slot extension section then provides means for extending the range of desired angles to which the pivoting guide may be fixed.

With the extended range, the square can be set to a wide range of angles, including obtuse angles, which permits marking sloped-roof rafter plumb line cuts with the tool located on the side of the cut line away from the end of the rafter on the outside of the building wall. This provides a safer, more stable, square location for the person marking the rafter cuts.

OBJECTS AND ADVANTAGES

One object of the present invention is to provide a framing square that minimizes the user's reach distance required to mark frame cuts.

A second object of the present invention is to provide a framing square that may be stably rested on a framing member edge to mark the transverse side of the framing member.

A third object of the present invention is to provide a framing square that provides flexibility in use by providing an obtuse angle adjustment.

BRIEF DESCRIPTION OF THE SEVERAL VIEWS OF THE DRAWINGS

A more complete understanding of the present invention can be obtained by considering the detailed description in conjunction with the accompanying drawings, in which.

REFERENCE NUMERALS IN DRAWINGS

Figure 1:
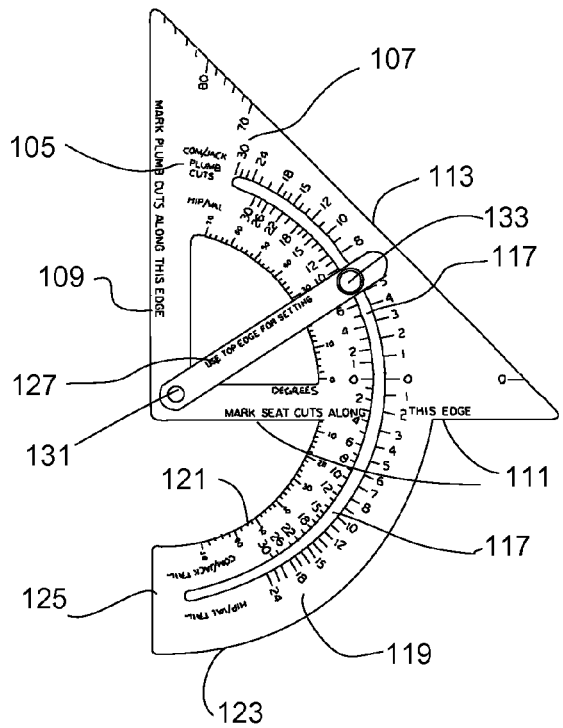
FIG. 1 is a first side view of the Obtuse Angle Range Adjustable Square.
Figure 3:
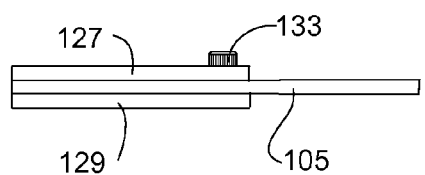
FIG. 3 is a top view of the Obtuse Angle Range Adjustable Square relative to the square position shown in FIG. 1.

These reference numbers are used in the drawings to refer to areas or features of the invention.

105 Frame
107 Triangular Section
109 First (Plumb Cut) Periphery Edge
111 Second (Seat Cut) Periphery Edge
113 Hypotenuse Periphery Edge
115 Pivot Opening
117 Adjustment Slot
119 Slot Extension Section
121 Interior Periphery Edge
123 Exterior Periphery Edge
125 Distal Periphery Edge
127 Pivoting Guide First Portion
129 Pivoting Guide Second Portion
131 Hinge Pin
133 Guide Pin
135 Hinge Pin Opening

DETAILED DESCRIPTION OF THE INVENTION

Figure 2:
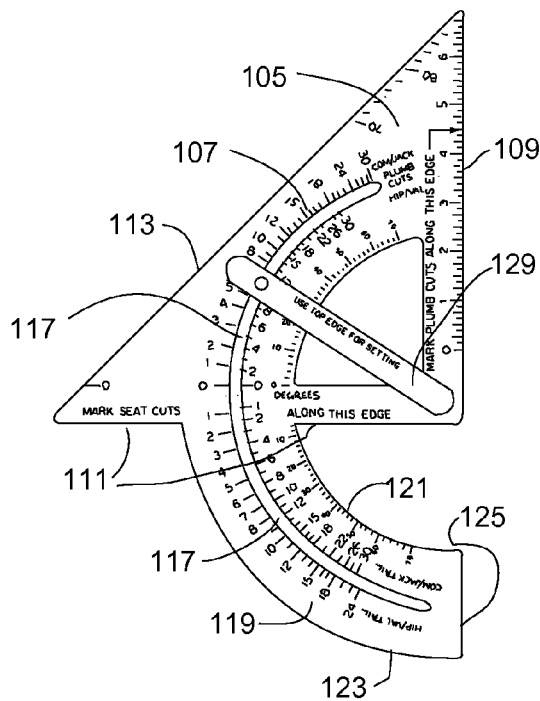
FIG. 2 is a second side view of the Obtuse Angle Range Adjustable Square.
Figure 4:
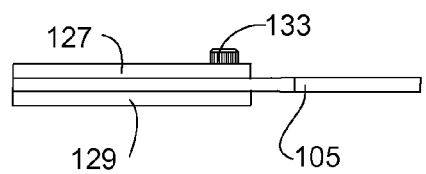
FIG. 4 is a bottom view of the Obtuse Angle Range Adjustable Square relative to the square position shown in FIG. 1.
Figure 5:
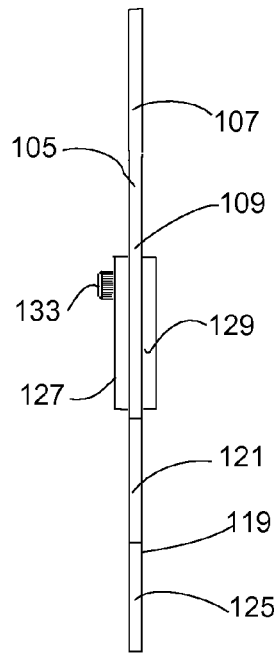
FIG. 5 is a left side view of the Obtuse Angle Range Adjustable Square relative to the square position shown in FIG. 1.
Figure 6:
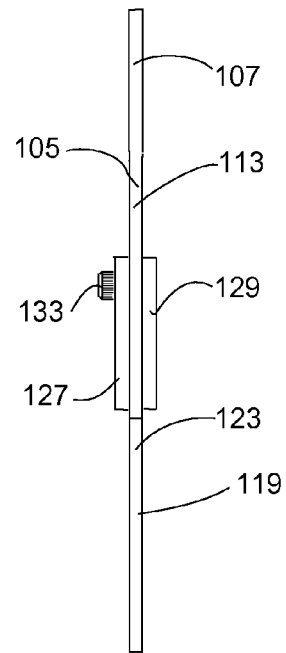
FIG. 6 is a right side view of the Obtuse Angle Range Adjustable Square relative to the square position shown in FIG. 1.
Figure 7:
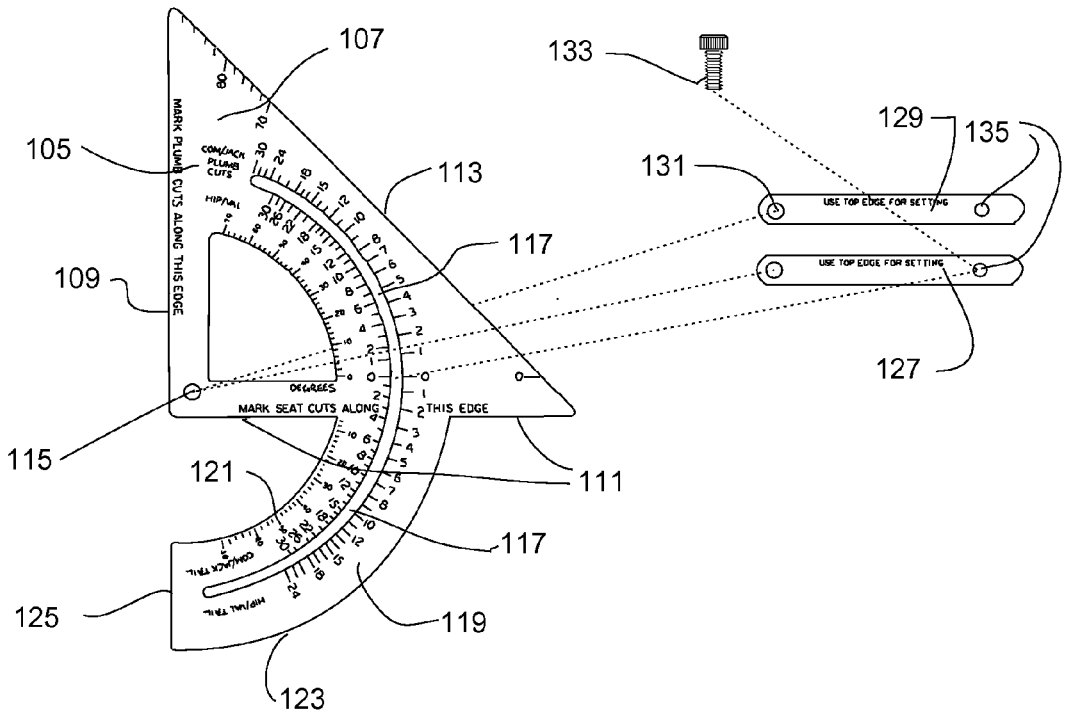
FIG. 7 is a first side view of the Obtuse Angle Range Adjustable Square showing the parts, with the broken lines indicating the assembly of the parts.

The obtuse angle adjustable square is shown in several views in FIGS. 1 through 6, and the parts are shown in FIG. 7. The square has a rigid frame (135) that has a triangular section (107) and a slot extension section (119). The triangular section (107) is an isosceles right triangle with a first (plumb cut) periphery edge (109) and a second (seat cut) periphery edge (111) at right angles with a hypotenuse periphery (113) joining the two at the ends opposite the right angle. The slot extension section (119) extends from the triangular section (107) second (seat cut) periphery edge (111) as shown in FIGS. 1 and 2. This section forms an interior periphery edge (121) and an exterior periphery edge (123). The section terminates with a distal periphery edge (125) that it is desirable, but not mandatory, to make coplanar with the triangular section (107) first (plumb cut) periphery edge (109) so as to provide an extension of the first (plumb cut) periphery edge (109).

An adjustment slot (117) extends from approximately 20 degrees from the first (plumb cut) periphery edge of the triangular section (107) past the second (seat cut) periphery edge (111) to a location of the slot extension section (119) near the distal periphery edge (125). This adjustment slot (117) is of substantially uniform width.

Adjustably mounted on the frame (105) near the right angle of the triangular section (107) is a pivoting guide consisting of a pivoting guide first portion (127) and a pivoting guide second portion (129). These portions (127) (129) of the pivoting guide are substantially identical with two substantially parallel and straight edges and a substantially parallel first and second surface. The second surface of the guide first portion (127) faces the frame first surface shown in FIG. 1 and the first surface of the guide second portion (129) faces the frame second surface shown in FIG. 2. The two portions (127) (129) of the pivoting guide are connected by a hinge pin (131) that goes through a hinge pin opening (135) in the frame, which is shown in the parts view of FIG. 7. The two portions (127) (129) of the pivoting guide are also connected by a guide pin (133) that is sized to fit within the adjustment slot (117) and is located on the guide portions (127) (129) at a set radius from the center of the hinge pin opening (135). The center of the adjustment slot (117) is at the same radius so the pivoting guide may be moved anywhere within the length of the adjustment slot (117). The guide pin (133) is adjustably arranged (example by male machine threads on the pin which connect to female machine threads on the guide second portion (129)) to releaseably clamp the two portions (127) (129) of the pivoting guide at a desired location in the adjustment slot (117) so as to maintain the pivoting guide in that position in the slot, and allow the release of that adjustment to reposition the pivoting guide. The views of FIGS. 1 through 6 show the pivoting guide in the same location in the adjustment slot (117).

The frame (105) has scale markings providing scales relating the position of the pivoting guide to roof rafter slopes. The scale markings relate to the pivoting guide portions (127) (129) edges. Angular measurements in degrees are also provided for acute angles.

Operation

Figure 8:
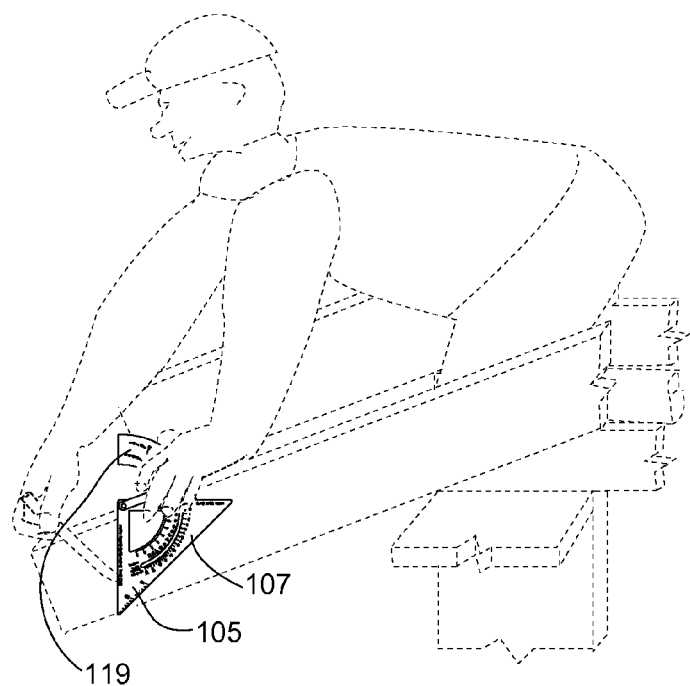
FIG. 8 is a perspective view of the use of the Obtuse Angle Range Adjustable Square for marking roofing support members for a plumb cut for fascia board mounting. The building framing and the user are in broken lines.

FIG. 8 shows a user marking a roof rafter for a plumb cut using the obtuse angle adjustable square. The user has determined the roof slope and marked the top of the roof rafter the desired distance of the cut from the building outer wall. The pivoting guide is set to an obtuse angle in the slot extension section of the adjustment slot where the pivoting guide portion edges facing the triangular portion of the square are aligned with the roof slope values on the scale markings on the frame. If correctly set to the roof pitch the resultant marking will be on the vertical, which is parallel to the building wall. The guide is held in one hand arranging the square first (plumb cut) periphery edge to face the end of the rafter to be cut, and the guide portion edges are placed on the top of the roof rafter to be marked. The first (plumb cut) periphery edge is aligned with the distance mark on top of the rafter and the side of the rafter is marked along the first (plumb cut) periphery edge as shown in FIG. 8.

Figure 9:
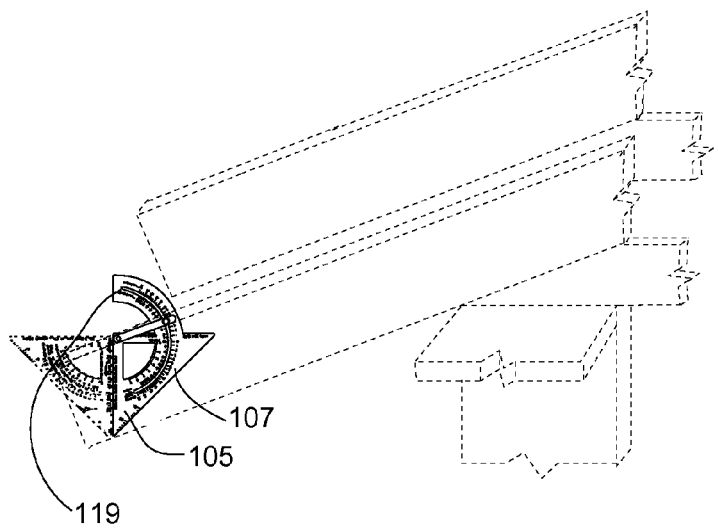
FIG. 9 is a perspective view comparing the relative positioning of the Obtuse Angle Range Adjustable Square relative to a prior art adjustable square that is limited to acute angles. The building framing and the prior art are in broken lines.

FIG. 9 shows the comparable positions of the obtuse angle adjustable square and a square that is not capable of measuring an obtuse angle, illustrating the further distance the user would need to stretch to mark the same cut as illustrated in FIG. 8.

Those familiar with the art recognize there are many possible applications and variations for the invention other than the embodiments recited. This recitation of the preferred and other embodiments is not intended to define or constrain the invention; rather the claims define the invention.

What is claimed is:

1. A building framing construction layout tool comprising:
   a. a frame with a first side and a second side;
   b. the frame arranged with a triangular section arranged in a right isosceles triangle-shaped outer periphery composed of a first (plumb cut) and second (seat cut) right angle periphery edge and a hypotenuse periphery edge, a pivot opening positioned adjacent to the right angle, an adjustment slot located at a fixed radius from the pivot opening starting at a location a set number of degrees from the first (plumb cut) right angle periphery edge and continuous to a position a set distance from the second (seat cut) right angle periphery edge;
   c. the frame further arranged with a slot extension section with an adjustment slot extending from the triangular section adjustment slot and located at the same fixed radius from the pivot opening, the slot extension section periphery with an interior and exterior periphery edge arranged adjacent to the adjustment slot and a distal periphery edge arranged substantially coplanar with the triangular section plumb cut right angle periphery edge; and
   d. a pivoting guide with a first portion with two substantially parallel and straight edges and a substantially parallel first and second surface, the second surface arranged adjacent to the frame first side, and a second portion arranged substantially similar to the first guide portion and located with the second portion first surface adjacent to the frame second side, the two guide portions connected at the frame pivot opening with a hinge pin and further arranged with a guide pin between the portions adjustably arranged in the frame adjustment slot and further arranged to releaseably clamp the pivoting guide portions to the frame such that the angular location of the pivoting guide may be adjusted to a desired location in the frame adjustment slot and releaseably secured in that desired location.

2. A building framing construction layout tool with a frame first side and a frame second side and an outer periphery arranged substantially as a right isosceles triangle, the periphery composed of a first (plumb cut) periphery edge in a right angle with a second (seat cut) periphery edge, and a hypotenuse periphery edge joining the two other periphery edges, a pivot opening arranged adjacent to the right angle, a triangular section adjustment slot arranged in an arc a set radius from the pivot opening and continuously spanning a range of angles within the right angle between the first (plumb cut) and second (seat cut) right edge peripheries, and an adjustable pivoting guide arranged with a hinge pin and a guide pin at a fixed distance apart corresponding to the radius between the pivot opening and the adjustment slot such that the guide is located at any desired angle in the adjustment slot, and arranged to be releaseably fixed at that desired angle, wherein the improvement comprises:

a. a frame slot extension portion extending from the frame outer periphery;

b. a slot extension portion adjustment slot extending from the frame adjustment slot; and c. the slot extension portion adjustment slot is located at the same fixed radius from the pivot opening as the triangular section adjustment slot and is arranged to extend the range of desired angles to which the pivoting guide may be fixed to include obtuse angles.

3. A method of manufacturing a building frame construction layout tool comprising:

a. forming a frame with a first side and a second side, the frame arranged with a triangular section arranged in a right isosceles triangle-shaped outer periphery composed of a first (plumb cut) and second (seat cut) right angle periphery edge and a hypotenuse periphery edge, a pivot opening positioned adjacent to the right angle, an adjustment slot located at a fixed radius from the pivot opening starting at a location a set number of degrees from the first (plumb cut) right angle periphery edge and continuous to a position a set distance from the second (seat cut) right angle periphery edge, the frame further arranged with a slot extension section with an adjustment slot extending from the triangular section adjustment slot and located at the same fixed radius from the pivot opening, the slot extension section periphery with an interior and exterior periphery edge arranged adjacent to the adjustment slot and a distal periphery edge arranged substantially coplanar with the triangular section plumb cut right angle periphery edge; and b. installing a pivoting guide with a first portion with two substantially parallel and straight edges and a substantially parallel first and second surface, the second surface arranged adjacent to the frame first side, and a second portion arranged substantially similar to the first guide portion and located with the second portion first surface adjacent to the frame second side, the two guide portions connected at the frame pivot opening with a hinge pin and further arranged with a guide pin between the portions adjustably arranged in the frame adjustment slot and further arranged to releaseably clamp the pivoting guide portions to the frame such that the angular location of the pivoting guide may be adjusted to a desired location in the frame adjustment slot and releaseably secured in that desired location.

\* \* \* \* \*